United States Patent [19]

Suzuki et al.

[11] Patent Number: 4,958,336

[45] Date of Patent: Sep. 18, 1990

[54] OPTICAL HEAD DEVICE

[75] Inventors: Yasuo Suzuki, Tokyo; Toru Tatsuno, Fuchu, both of Japan

[73] Assignee: Canon Kabushiki Kaisha, Tokyo, Japan

[21] Appl. No.: 323,224

[22] Filed: Mar. 13, 1989

Related U.S. Application Data

[63] Continuation of Ser. No. 922,855, Oct. 24, 1986, abandoned.

[30] Foreign Application Priority Data

Nov. 8, 1985 [JP] Japan ................................ 60-249016

[51] Int. Cl.$^5$ ................................................ G11B 7/08
[52] U.S. Cl. ............................................... 369/44.21
[58] Field of Search .................................... 369/44–46, 369/112, 121, 122; 350/247, 255; 250/201 DF

[56] References Cited

U.S. PATENT DOCUMENTS

| | | | |
|---|---|---|---|
| 4,236,232 | 11/1980 | Jansen et al. | 369/44 |
| 4,467,463 | 8/1984 | Yano | 369/45 |
| 4,546,460 | 10/1985 | Ando | 369/112 |
| 4,566,089 | 1/1986 | Kime | 369/45 |
| 4,571,026 | 2/1986 | Maruta | 350/247 |
| 4,643,522 | 2/1987 | Takashima | 350/255 |
| 4,644,516 | 2/1987 | Musha | 369/43 |
| 4,687,296 | 8/1987 | Terayama et al. | 350/247 |

Primary Examiner—Donald McElheny, Jr.
Attorney, Agent, or Firm—Fitzpatrick, Cella, Harper & Scinto

[57] ABSTRACT

An optical head device includes an optical head body, a support shaft directly provided on the optical head body, an optical system holding member movably supported by the support shaft, an optical system held by the optical system holding member for directing a light beam supplied from the optical head body to an object to be irradiated, and drive means for moving the optical system relative to the optical head body.

4 Claims, 3 Drawing Sheets

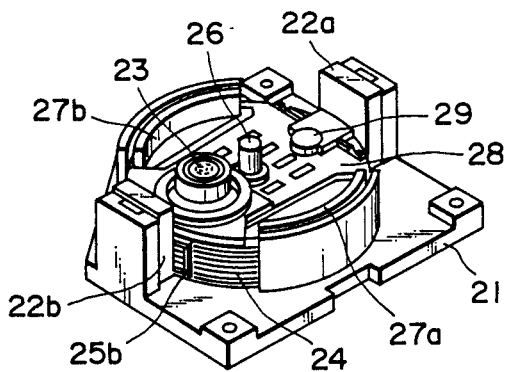
FIG. I
PRIOR ART
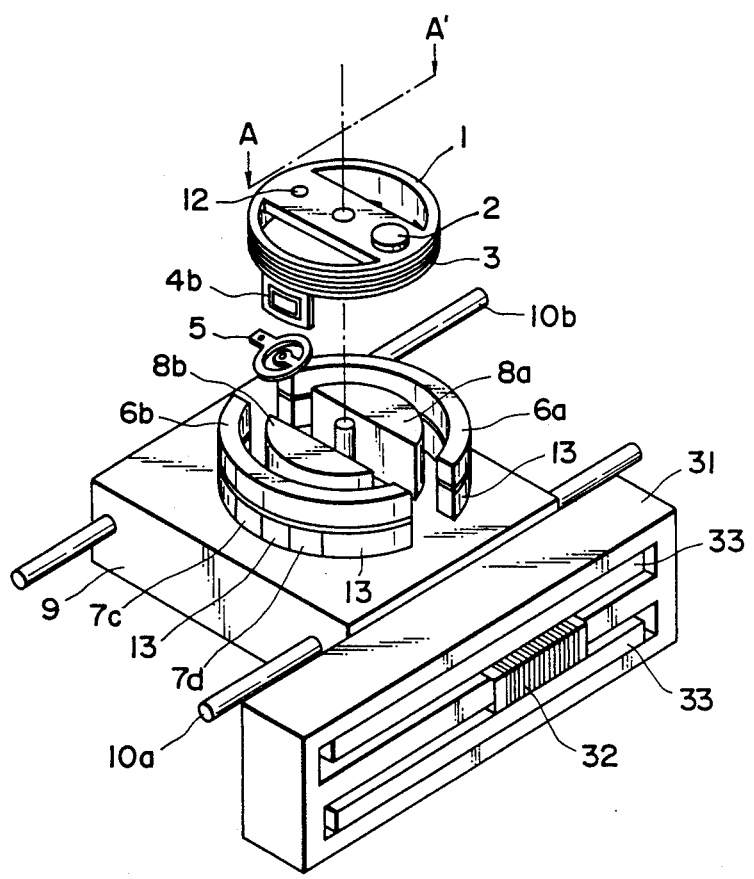
FIG. 2

OPTICAL HEAD DEVICE

This application is a continuation of application Ser. No. 922,855 filed Oct. 29, 1986, now abandoned.

BACKGROUND OF THE INVENTION

1. Field of the Invention

This invention relates to an optical head device, and in particular to an optical head device having a support shaft, an optical system holding member movably supported by the support shaft, an optical system held by the optical system holding member, and drive means for moving the optical system. Such an optical head device is used to record or reproduce information on or from a recording carrier in an optical information recording-reproducing apparatus, such as an optical disk memory.

2. Related Background Art

In an optical head device according to the prior art, a driving mechanism for an optical system such as an objective has been made separately from an optical head body containing a light source, for instance, therein and the final apparatus has been constructed by joining these. An example of this will hereinafter be described.

FIG. 1 of the accompanying drawings is a perspective view showing only the objective driving portion in the optical head device according to the prior art. As shown in FIG. 1, an objective holding member 28 is inserted over a support shaft 26 secured to a base bed 21 as by being pressed in, through a bearing, and an objective 23 and a weight 29 substantially equal in weight to the objective 23 are mounted near the support shaft 26. A neutral point retaining member, not shown, is mounted below the weight 29. A coil 24 for focusing is wound on the outer peripheral portion of the objective holding member 28, and a coil 25b for tracking and a coil 25a for tracking (not shown, is disposed at a location opposite to the coil 25b for tracking with respect to the support shaft 26) are mounted on the coil 24. Permanent magnets 27a and 27b for focusing having their opposed poles formed near the outer and inner peripheral portions of the objective holding member 28 are secured to the base bed 21 so as to be opposed to the coil 24 for focusing, and permanent magnets 22a and 22b tracking are secured in the vicinity of the outer peripheral portion of the objective holding member 28 so as to be opposed to the coils 25a and 25b for tracking. By an electromagnetic force produced by a current flowing to the coil 24 for focusing and the coils 25a and 25b for tracking and magnetic fields formed relative to the respective coils, the objective holding member 28 is vertically moved and horizontally pivoted about the support shaft 26.

The optical head device has been constructed by securing the base bed 21 to which the permanent magnets 22a, 22b for tracking, the permanent magnets 27a, 27b for focusing and the support shaft 26 are secured, to the optical head body by means of screws.

However, in the prior-art optical head device described above, the base bed, screws, etc. have been required. This has led to a great number of parts and has required much time for assembly. Moreover, it is difficult to make the optical head device light in weight. Also, the mounting of the support shaft 26 with respect to the optical head body is done through the intermediary of the base bed 21. This reduce the accuracy of the inclination of the support shaft 26 with respect to the optic axis of the light beam from the optical head body

SUMMARY OF THE INVENTION

It is an object of the present invention to provide an optical head device which is light in weight and can be made with good accuracy so that the support shaft of the optical system is not inclined with respect to the optic axis.

The above object of the present invention is achieved by an optical head device comprising an optical head body, a support shaft directly provided on said optical head body, an optical system holding member movably supported by said support shaft, an optical system held by said optical system holding member for directing a light beam supplied from said optical head body to an object to be irradiated, and drive means for moving said optical system relative to said optical head body. That is, the present invention eliminates the base bed for the optical system driving portion and mounts the support shaft directly on the optical head body, whereby the weight of the optical head device is made lighter and the accuracy error of inclination of the support shaft with respect to the optic axis of the optical system of the optical head body is decreased.

BRIEF DESCRIPTION OF THE DRAWINGS

FIG. 1 is a perspective view showing the construction of an objective driving portion in an optical head device according to the prior art.

FIG. 2 is an assembled perspective view showing an embodiment of an optical head device according to the present invention.

DESCRIPTION OF THE PREFERRED EMBODIMENTS

Figure 3:
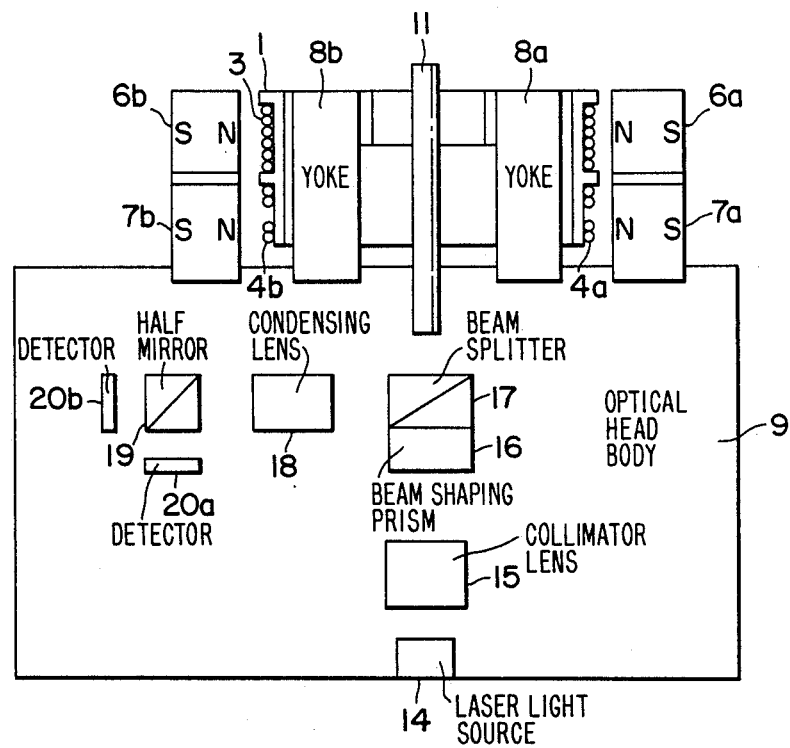
FIG. 3 is a schematic cross-sectional view of the device of FIG. 2.

An embodiment of the present invention will hereinafter be described in detail with reference to the drawings FIG. 2 is an assembled perspective view of an embodiment of the optical head device of the present invention.

In FIG. 2, an objective holding member 1 is inserted over a support shaft 11 through a bearing. An objective 2 and a weight 12 substantially equal in weight to the objective 2 for keeping weight balance are mounted near the bearing. A coil 3 for focusing is wound on the outer peripheral portion of the objective holding member 1, and rectangular coils 4a and 4b for tracking are attached under the coil 3.

The support shaft 11 is directly secured, to an optical head body 9 as by being pressed thereinto and therefore can easily reduce the inclination thereof with respect to the optic axis of an optical system provided in the optical head body 9 to 0.1° or less. On the optical head body 9, permanent magnets 7a, 7b, 7c and 7d for tracking are secured to the vicinity of the outer peripheral portion of the objective holding member 1 so as to be opposed to the coils 4a and 4b for tracking and non-magnetic members 13 are secured so as to hold these permanent magnets for tracking therebetween. Although the coil 4a for tracking and the permanent magnets 7a and 7b for tracking are not shown, they are mounted at locations opposite to the coil 4b for tracking and the permanent magnets 7c and 7d for tracking, respectively, with respect to a support shaft 26.

Permanent magnets 6a and 6b are secured on the permanent magnets 7a-7d for tracking and the non-magnetic members 13 so as to be opposed to the coil 3 for focusing. Yokes 8a and 8b as the opposed magnetic poles of the permanent magnets 7a-7d for tracking and the permanent magnets 6a, 6b for focusing are secured to the vicinity of the inner peripheral portion of the objective holding member 1 so as to be opposed to the inner peripheral portion. Since the coil 3 for focusing and the coils 4a, 4b for tracking are mounted separately, the intervals between the permanent magnets 6a, 6b for focusing and the yokes 8a, 8b and between the permanent magnets 7a-7d for tracking and the yokes 8a, 8b become narrower to increase magnetic flux density.

The permanent magnets 6a, 6b for focusing, the permanent magnets 7a-7d for tracking, the yokes 8a, 8b and the non-magnetic members 13 are attached directly to the optical head body 9 by an adhesive agent or the like.

The retention of the neutral point of the objective holding member 1 is accomplished by neutral point retaining rubber 5 secured to the optical head body 9. The objective holding member 1 is horizontally pivotable and vertically slidable within its retention range.

There are various driving systems available for the optical head body 9, but herein is shown an embodiment using a linear motor capable of high-speed access operation. Reference characters 10a and 10b designate rails, reference numeral 31 denotes a yoke, reference numeral 32 designates a linear motor coil, and reference numeral 33 denotes a magnet.

FIG. 3 is a vertical cross-sectional view of the optical head device of FIG. 2 after assembly taken along line A-A' of FIG. 2.

Figure 3A:
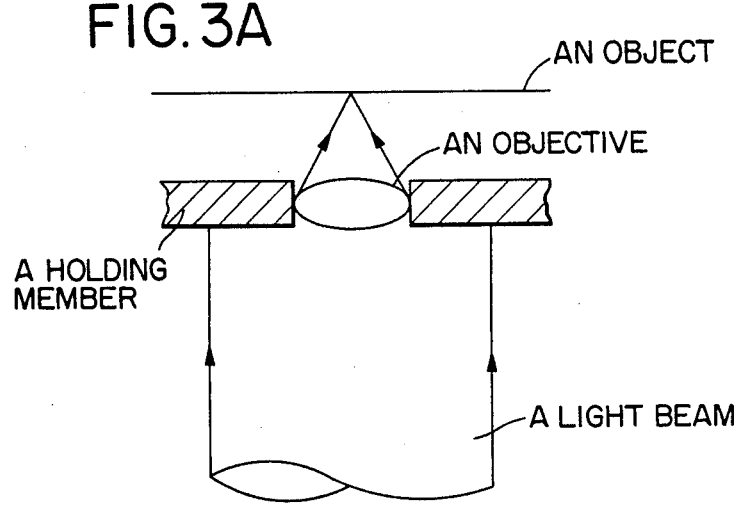
FIG. 3A shows a schematic cross-sectional view of how the objective lens causes the light beam from the light source to irradiate an object in one position.
Figure 3B:
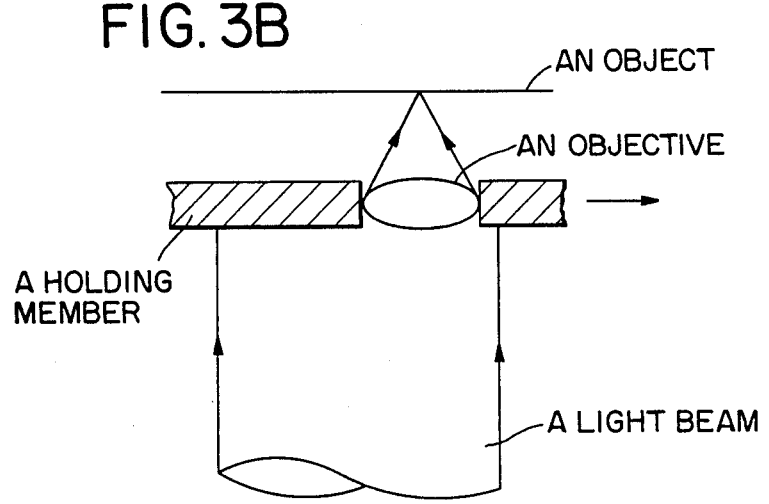
FIG. 3B shows how the objective lens causes the light beam from the light source to irradiate the object when the member holding the objective lens is displaced.

As shown in FIG. 3, the permanent magnets 6a, 6b for focusing and the permanent magnets 7a, 7b for tracking are disposed with their same poles being parallel to each other because if they are disposed with their different poles being parallel to each other, magnetic fields will not be produced perpendicularly to the respective coils and focus control and tracking control cannot be accomplished. The non-magnetic members 13 are disposed between adjacent ones of the permanent magnets 7a, 7b, 7c and 7d for tracking to prevent the magnetic fields from being disturbed. In the present embodiment four permanent magnets 7a-7d for tracking are shown as being provided for two coils 4a and 4b for tracking, but the present invention is also applicable to a case wherein two permanent magnets for tracking are provided for four coils for tracking. Optical parts such as a laser light source 14, a collimator lens 15, a beam shaping prism 16, a beam splitter 17, a condensing lens 18, a half-mirror 19 and detectors 20a, 20b are installed within the optical head body 9. In the present embodiment, the optical head device can be made light in weight and high-speed access becomes possible. Further, even when the objective holding member 1 is displaced, the light from laser light source 14 will still irradiate the object, as illustrated in FIGS. 3A and 3B.

The present invention is not restricted to the above-described embodiment, but various applications thereof are possible. For example, the optical system driven is not limited to the objective, but may be a collimator lens or the like. The present invention is applicable not only to the aforedescribed optical information recording-reproducing apparatus, but also to shape measuring apparatuses, distance measuring apparatuses, laser working apparatuses, etc.

What is claimed is:

1. An optical head comprising:
   a light source for emitting a light beam;
   an optical member for guiding the light beam emitted from said light source to an object to be irradiated, said optical member having an optical axis;
   a single member optical head body in which said optical member is installed;
   a support shaft directly secured to said optical head body by being pressed therein, said support shaft being secured substantially free from inclination with respect to the optical axis of said optical member;
   an objective holding member movably supported by said support shaft;
   an objective for condensing the light beam passing through said optical member onto the object, said objective being held by said objective holding member;
   drive means for moving said objective relative to said optical head body; and
   a motor for moving said optical head body.

2. An optical head according to claim 1, wherein said objective holding member is pivotable about said support shaft and slidable in the axial direction of said support shaft.

3. An optical head according to claim 1, wherein said drive means comprises coil means and a permanent magnet for producing a magnetic field across said coil means, one of said coil means and said permanent magnet being secured to said optical head body and the other being secured to said objective holding member.

4. An optical head according to claim 1, wherein said drive means comprises a coil for focusing and a coil for tracking, said coils being attached to said objective holding member so that said coils are not superimposed on each other.

* * * * *

UNITED STATES PATENT AND TRADEMARK OFFICE
CERTIFICATE OF CORRECTION

PATENT NO. : 4,958,336

DATED : September 18, 1990

INVENTOR(S) : Yasuo Suzuki et al.

It is certified that error appears in the above-identified patent and that said Letters Patent is hereby corrected as shown below:

COLUMN 1

Line 45, "permanent magnets 22a and 22b" should read --permanent magnets 22a and 22b for--;
    Line 52, "tracking and" should read --tracking, and the--;
    Line 57, "base bed 21" should read --base bed 21,--;
    Line 68, "reduce" should read --reduces--.

COLUMN 2

Line 2, "body" should read --body.--;
    Line 59, "secured," should read --secured--; and
    Line 65, "to" should read --in--.

COLUMN 3

Line 13, "to" should read --in--;
    Line 44, "other" should read --other,--; and
    Line 56, "parts" should read --parts,--.

Signed and Sealed this

Thirty-first Day of March, 1992

*Attest:*

HARRY F. MANBECK, JR.

*Attesting Officer*      *Commissioner of Patents and Trademarks*